United States Patent
Nadgowda et al.

(10) Patent No.: US 11,989,570 B2
(45) Date of Patent: May 21, 2024

(54) SECURE DEVSECOPS PIPELINE WITH TASK SIGNING

(71) Applicant: International Business Machines Corporation, Armonk, NY (US)

(72) Inventors: Shripad Nadgowda, Elmsford, NY (US); Laura-Zaihua Luan, Scarsdale, NY (US); James R. Doran, New Milford, CT (US)

(73) Assignee: International Busi ness Machines Corporation, Armonk, NY (US)

( * ) Notice: Subject to any disclaimer, the term of this patent is extended or adjusted under 35 U.S.C. 154(b) by 515 days.

(21) Appl. No.: 17/241,699

(22) Filed: Apr. 27, 2021

(65) Prior Publication Data

US 2022/0342679 A1 Oct. 27, 2022

(51) Int. Cl.
| | | |
|---|---|---|
| G06F 21/00 | (2013.01) | |
| G06F 9/445 | (2018.01) | |
| G06F 9/54 | (2006.01) | |
| G06F 21/12 | (2013.01) | |
| G06F 21/64 | (2013.01) | |

(52) U.S. Cl.
CPC .......... *G06F 9/44589* (2013.01); *G06F 9/542* (2013.01); *G06F 9/544* (2013.01); *G06F 9/547* (2013.01); *G06F 21/128* (2013.01); *G06F 21/64* (2013.01)

(58) Field of Classification Search
CPC ...... G06F 9/44589; G06F 9/542; G06F 9/544; G06F 9/547; G06F 21/128; G06F 21/64
See application file for complete search history.

(56) References Cited

U.S. PATENT DOCUMENTS

| | | | |
|---|---|---|---|
| 9,547,484 B1* | 1/2017 | Frazier | G06F 11/3466 |
| 10,656,927 B2 | 5/2020 | Hawrylo | |
| 10,664,379 B2 | 5/2020 | Hortala | |
| 10,761,913 B2 | 9/2020 | McClory | |
| 2020/0034742 A1 | 1/2020 | Dirac | |
| 2020/0356085 A1* | 11/2020 | Wentz | H04L 9/0866 |
| 2021/0349736 A1* | 11/2021 | Callery | G06F 9/44505 |
| 2022/0181012 A1* | 6/2022 | Skelton | G16H 40/63 |

OTHER PUBLICATIONS

"In-toto Specification," Version 0.9, Mar. 25, 2020, Github, The Linux Foundation, 42 pages.

(Continued)

*Primary Examiner* — Ghazal B Shehni
(74) *Attorney, Agent, or Firm* — Van Leeuwen & Van Leeuwen; Kimberly Zillig (57) ABSTRACT

An approach is disclosed that selects a current processing element from a set of processing elements included in a software pipeline. A selected input data to the current processing element was an output data from a previously executed processing element. The input data is verified by computing a current fingerprint of the selected input data and comparing the computed fingerprint to an expected fingerprint. The expected fingerprint was previously computed after the output data was generated by the previously executed processing element. In response to the comparing revealing that the current fingerprint fails to match the expected fingerprint, a verification error is indicated to a user of the process.

17 Claims, 7 Drawing Sheets

(56) References Cited

OTHER PUBLICATIONS

Anonymous, "Executable Integrity Verification," ip.com, IPCOM000205271D, Mar. 23, 2011, 9 pages.
Anonymous, "Cognitive Signature Verification System With Blockchain," ip.com, IPCOM000261071D, Jan. 24, 2020, 5 pages.
Anonymous, "Sparse N-Train Set Gan Pipeline to Build Artifact Quantifier," ip.com, IPCOM000261199D, Feb. 7, 2020, 6 pages.
Anonymous, "Secure Build and Policy Updates," ip.com, IPCOM000263761D, Oct. 2, 2020, 5 pages.
Anonymous, "Method for AI Pipeline Scheduling and Execution," ip.com, IPCOM000264879D, Feb. 3, 2021, 7 pages.
Shenoy et al., "A Performance and Area Efficient Architecture for Intrusion Detection Systems," 2011 IEEE International Parallel & Distributed Processing Symposium, May 2011, Anchorage, Alaska, pp. 301-310.

* cited by examiner

SECURE DEVSECOPS PIPELINE WITH TASK SIGNING

BACKGROUND

A DevOps pipeline is a set of practices that the development (Dev) and operations (Ops) teams implement to build, test, and deploy software faster and easier. One of the primary purposes of a pipeline is to keep the software development process organized and focused. A pipeline is of a chain of processing elements (tasks, etc.), arranged so that the output of each element can be used as input to a subsequent element. The information that flows in these pipelines is often a stream of records, bytes, or bits, and the elements of a pipeline may be called filters; this is also called the pipes and filters design pattern. Elements can also receive inputs from sources external to the pipeline, such as source code that is retrieved from a repository. A DevSecOps pipeline integrates security into the software development lifecycle. While DevSecOps introduces security (Sec) measures and tests into the pipeline so that security-related techniques are deployed.

As used herein, "software pipelines," such as the open source Tekton™ pipeline, are used to configure and run continuous integration and continuous delivery software pipelines. These pipelines are defined in configuration files, such as "yaml files," that are typically stored in a repository, such as a Git repository (repo). The pipeline provides a set of resource extensions used to define pipelines, some of these extensions include (1) "Tasks" that define a set of build steps such as compiling code, running tests, and building and deploying images; (2) "TaskRun" that Instantiates a Task for execution with specific inputs, outputs, and execution parameters. Can be invoked on its own or as part of a pipeline; (3) "Pipeline" that defines the set of tasks that compose a pipeline; (4) "PipelineRun" that Instantiates a Pipeline for execution with specific inputs, outputs, and execution parameters; and (5) "PipelineResource" that defines an object that is an input (such as a Git repository) or an output (such as a Docker image) of the pipeline.

SUMMARY

An approach is disclosed that selects a current processing element from a set of processing elements included in a software pipeline. A selected input data to the current processing element was an output data from a previously executed processing element. The input data is verified by computing a current fingerprint of the selected input data and comparing the computed fingerprint to an expected fingerprint. The expected fingerprint was previously computed after the output data was generated by the previously executed processing element. In response to the comparing revealing that the current fingerprint fails to match the expected fingerprint, a verification error is indicated to a user of the process.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

FIGS. 1-7 show an approach that provides task authenticity to a software pipeline. This ensuring that only "official" or "signed" tasks are executed in the pipeline. For example, such authenticity can ensure and/or prove the 'git-clone' task that the developer is using in the pipeline is actually coming from the user's designated file location (e.g., tekton-catalog/tasks/git-clone, etc.).

The approach also provides artifact integrity by ensuring that every artifact generated in the pipeline is tamper-proof by computing a "fingerprint," also known as a "digital signature" of the generated artifacts using a fingerprinting algorithm. A fingerprinting algorithm is a procedure that maps an arbitrarily large data item (such as a computer file) to a much shorter bit string, its fingerprint, that uniquely identifies the original data for all practical purposes, similar to how human fingerprints uniquely identify people for practical purposes. Fingerprint functions may be seen as high-performance hash functions used to uniquely identify substantial blocks of data where cryptographic hash functions may be unnecessary. Audio fingerprint algorithms should not be confused with this type of fingerprint function. For example, artifact integrity can ensure, or prove, that any source code artifacts from a clone directory that are output by a 'git-clone' task have not altered and have not been tampered. Consequently, artifact integrity further ensures that every artifact consumed (input) by tasks in the pipeline have not been is not tampered with prior to being input by the task. For example, this aspect of artifact integrity can ensure, or prove, the evidence json produced by a preceding task and being consumed by a current task has not been tampered with by another user or process.

The approach also provides result verification and non-repudiation by facilitating a path to provide verification and non-repudiation proofs for externally published results. For example, the approach provides result verification and non-repudiation and can prove the git-status set to a developer's repository is "correct" and has not been tampered with by another user or process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
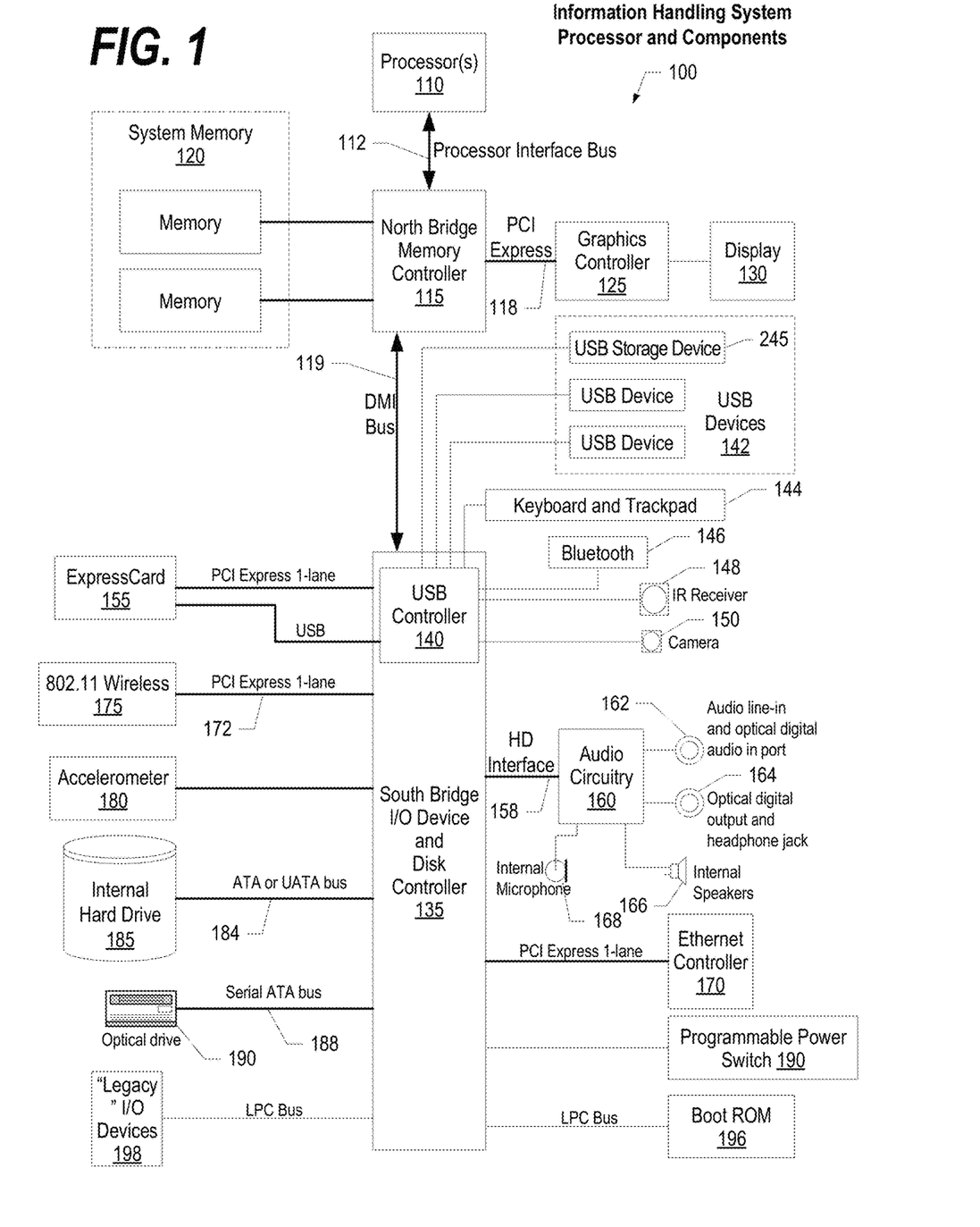
FIG. 1 is a block diagram of a data processing system in which the methods described herein can be implemented.
Figure 2:
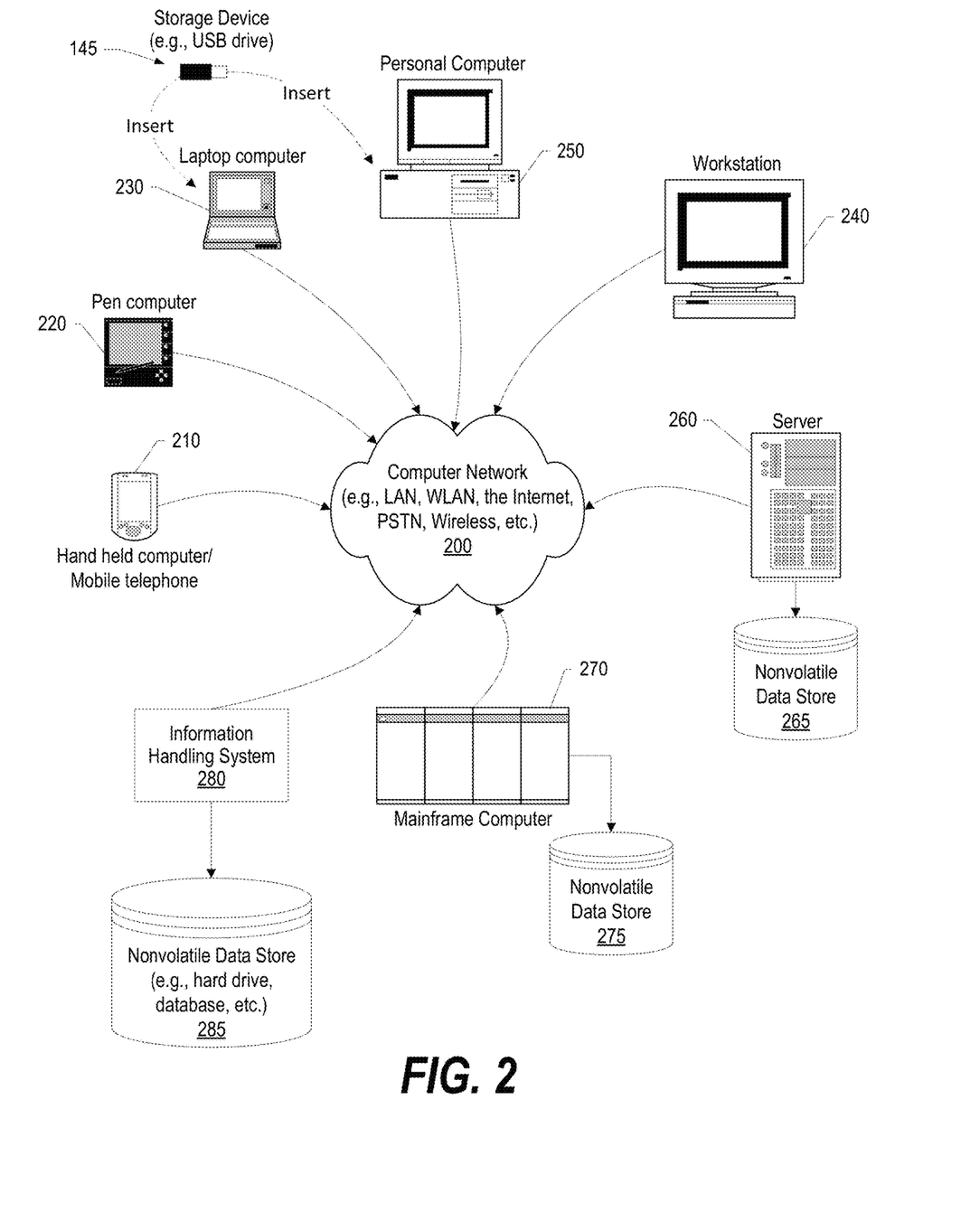
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
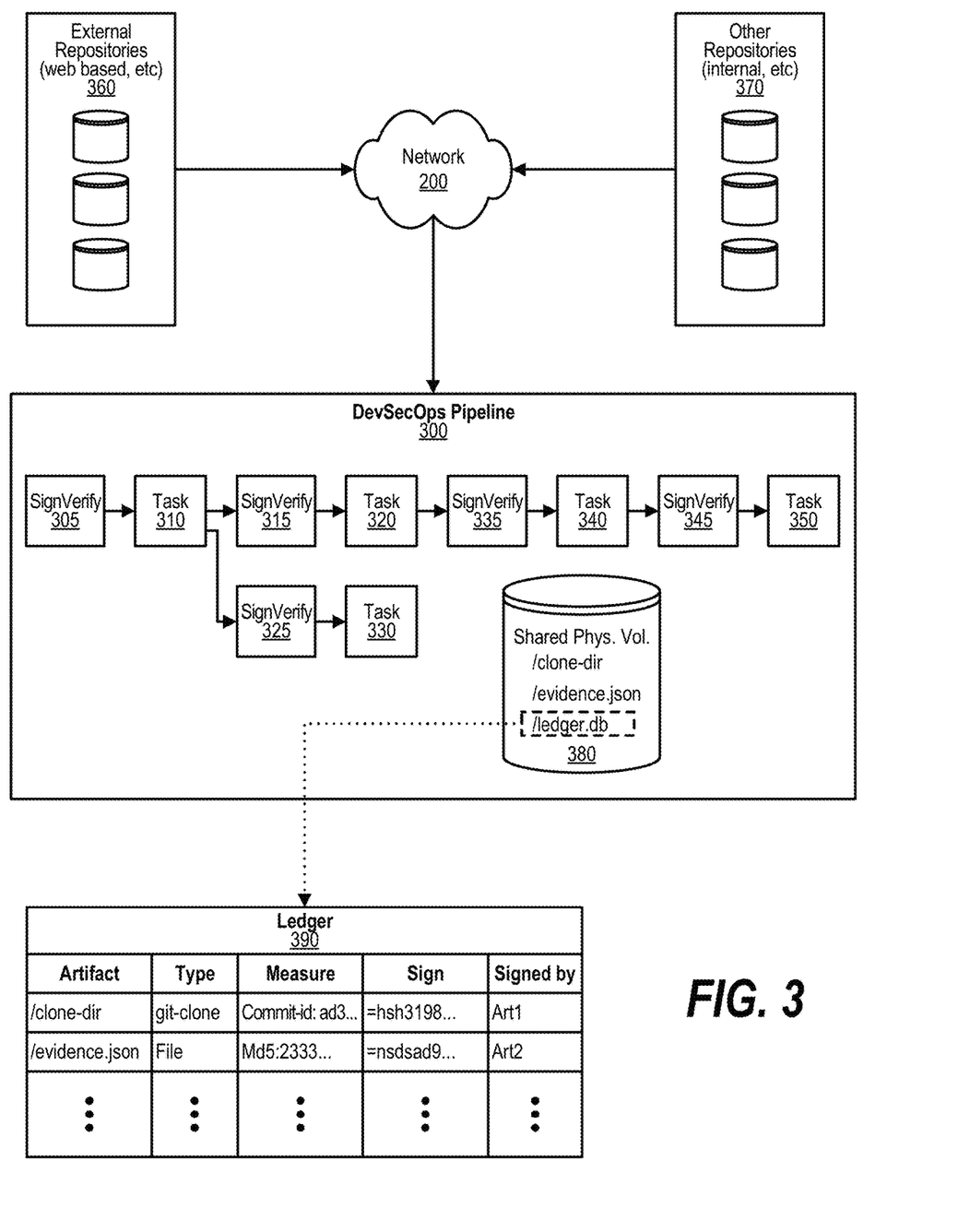
FIG. 3 is a component diagram depicting components and data stores utilized in a secured software pipeline operation.

FIG. 3 is a component diagram depicting components and data stores utilized in a secured software pipeline operation. Software pipeline 300 include a number of tasks that are executed sequentially with some tasks being executed in parallel with other tasks. Before each task is executed, a sign and verify process is performed that signs (fingerprints) any outputs from the previous task and verifies the inputs to the task that is about to be executed. The verification is performed by comparing fingerprints of data about to be input by the current task with corresponding "expected" fingerprints that were previously computed, such as when the data was generated by a previous task or beforehand, such as a fingerprint of a file input from external repositories 360 or other repositories 370.

In the example shown, sign/verify process 305 is performed before task 310 that was configured in the pipeline definition is executed. Any inputs to task 305 have fingerprints computed and these computed fingerprints are compared to expected fingerprints. If the fingerprints do not match, indicating that the input has been inadvertently or deliberately altered, an exception is recorded and eventually reported to the user to notify the user that the input was not the input that was expected. Shared physical volume 380 is a data store where any clone directories (e.g., from repositories 360 and 370, etc.) are stored as well as data generated by the execution of the various tasks.

As previously mentioned, tasks can be executed serially as well as in parallel with such execution largely determined by the developer that prepares the configuration file that is used by the software pipeline to run the various tasks. In the example shown, task 330 is executed in parallel with task 320 with both of these tasks following initial task 310. A sign/verify process (315 and 325, respectively) is run before the execution of these tasks. Sign/verify process 315 generates fingerprints on outputs from task 310 and compares fingerprints of any of these outputs that are being used as inputs to task 320. Likewise, sign/verify process 325 generates fingerprints on outputs from task 310 and compares fingerprints of any of these outputs that are being used as inputs to task 330. An exception is raised when the fingerprint computed for any input data does not match the expected fingerprint for such input data.

Two more tasks are shown following serially after task 320 (tasks 340 and 350) with a sign/verify process (process 335 and 345, respectively) being performed before each of these tasks. Again, whenever a fingerprint of an input data being input by any of these tasks does not match an expected fingerprint, an exception is raised and a notation is recorded so that the user (e.g., developer, etc.) is informed of the input data elements that may have been altered before being used by a particular task. In one embodiment, the fingerprint data is maintained in ledger 390 with the ledger listing each artifact used as input by any of the tasks in software pipeline 300 as well as each output generated by each of the tasks. When a data element is being input that is not generated by a preceding task, such as a source code file being input from repository 360 or 370, the developer can use a fingerprinting software tool to compute the fingerprint of such "external" data element and record the fingerprint in ledger 390. Ledger 390 lists each of the artifacts used as inputs and/or outputs of tasks in the pipeline along with the type of each artifact, the fingerprint measurement, the fingerprint sign, and the identifier of the entity that performed the fingerprinting.

Figure 4:
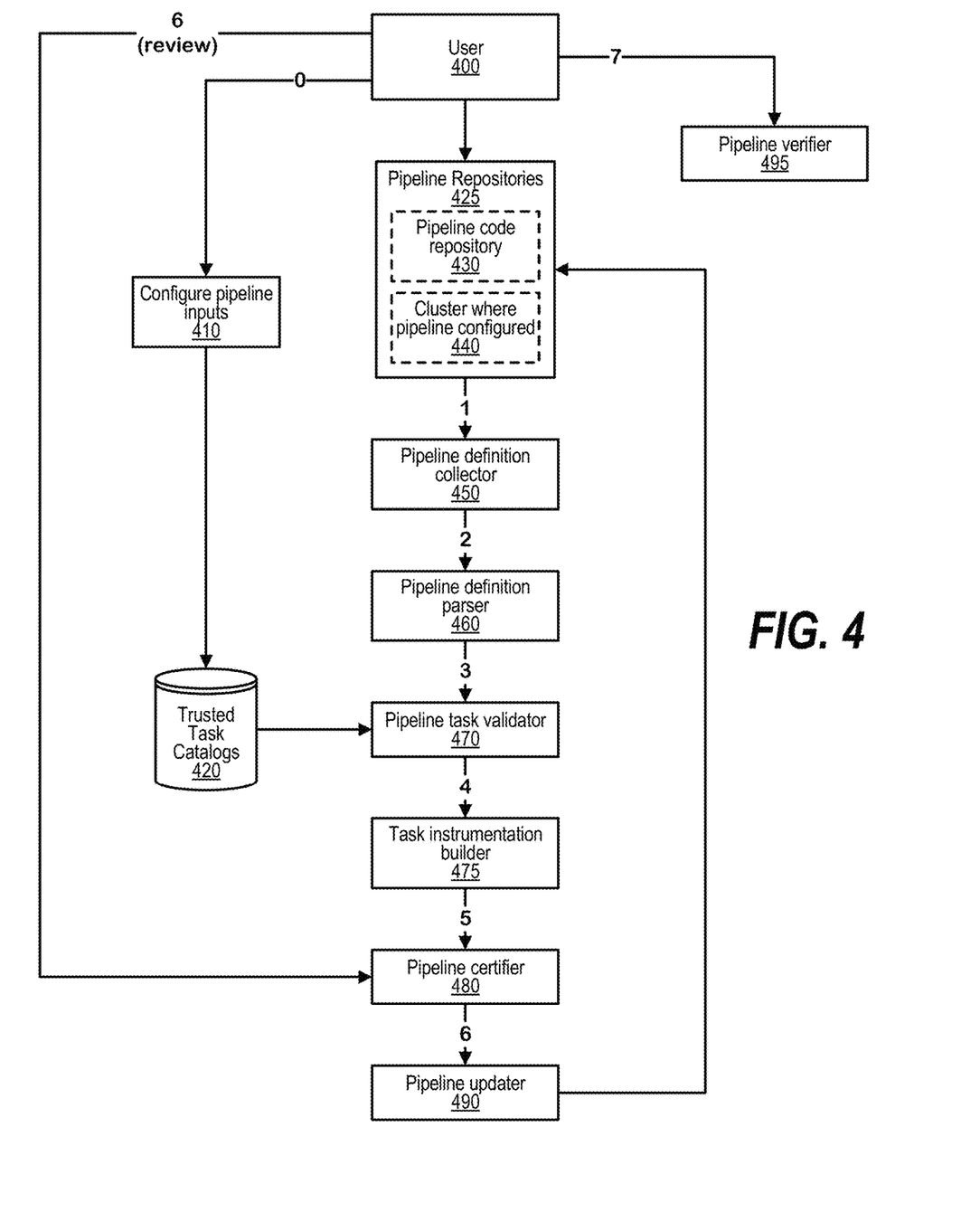
FIG. 4 is a flowchart depicting a high-level flow diagram of processes that occur in a secured software pipeline operation.

FIG. 4 is a flowchart depicting a high-level flow diagram of processes that occur in a secured software pipeline operation. User 400, such as a developer, configures the pipeline (step 0) before the pipeline is executed. Configure pipeline inputs process 410 identifies the tasks and inputs that will be used (read) by each of the tasks in the pipeline, such as the tasks shown in FIG. 3. The pipeline configuration data is stored in data store 420 as trusted task catalogs. In addition, when the user is configuring inputs, the user can also use a fingerprinting process to compute the fingerprint of any external data, such as source code files from external data repositories, that will be used in any of the tasks that are being configured by the user.

Pipeline repositories 425 include pipeline code repository 430 as well as cluster 440 where the pipeline is configured. The repositories include data stores where data, such as source code files, etc. are stored as well as where outputs from tasks (used as inputs by other tasks) are also stored.

At step 1, Pipeline Definition Collector 450, the pipeline process consolidates the pipeline and task definitions from the repositories and/or a live cluster into a single directory. At step 2, Pipeline Definition Parser 460, the pipeline process parses the pipeline definitions and discovers any task dependencies, task specifications, task input/output parameters, and the specified ordering of tasks including tasks that are serialized and tasks that can be executed in parallel with other tasks. At step 3, Pipeline Task Validator 470, the pipeline process performs any initial "sanity" checks that ensure the authenticity of tasks by verifying against (optionally) user provided inputs. For example, the validator can compute fingerprints for input files, such as source code files input by tasks in the pipeline, and compare such computed fingerprints with expected fingerprints corresponding to such files. At step 4, Task Instrumentation Builder 475, the pipeline process adds special instrumentation tasks before and after every task that accesses any shared and/or new artifacts, such as artifacts generated as outputs by previously executed tasks in the pipeline.

At step 5, Pipeline Certifier 480, the pipeline process uses either an automated or manual user review to certify the instrumented pipeline. At step 6, Pipeline Updater 490, the pipeline process implements and updates the certified pipeline on the cluster and/or in the code repository. Finally, at step 7, Pipeline Verifier 495 verifies that the pipeline was run successfully with fingerprints of all data input to the various tasks of the pipeline matching the expected fingerprints of such data.

Figure 5:
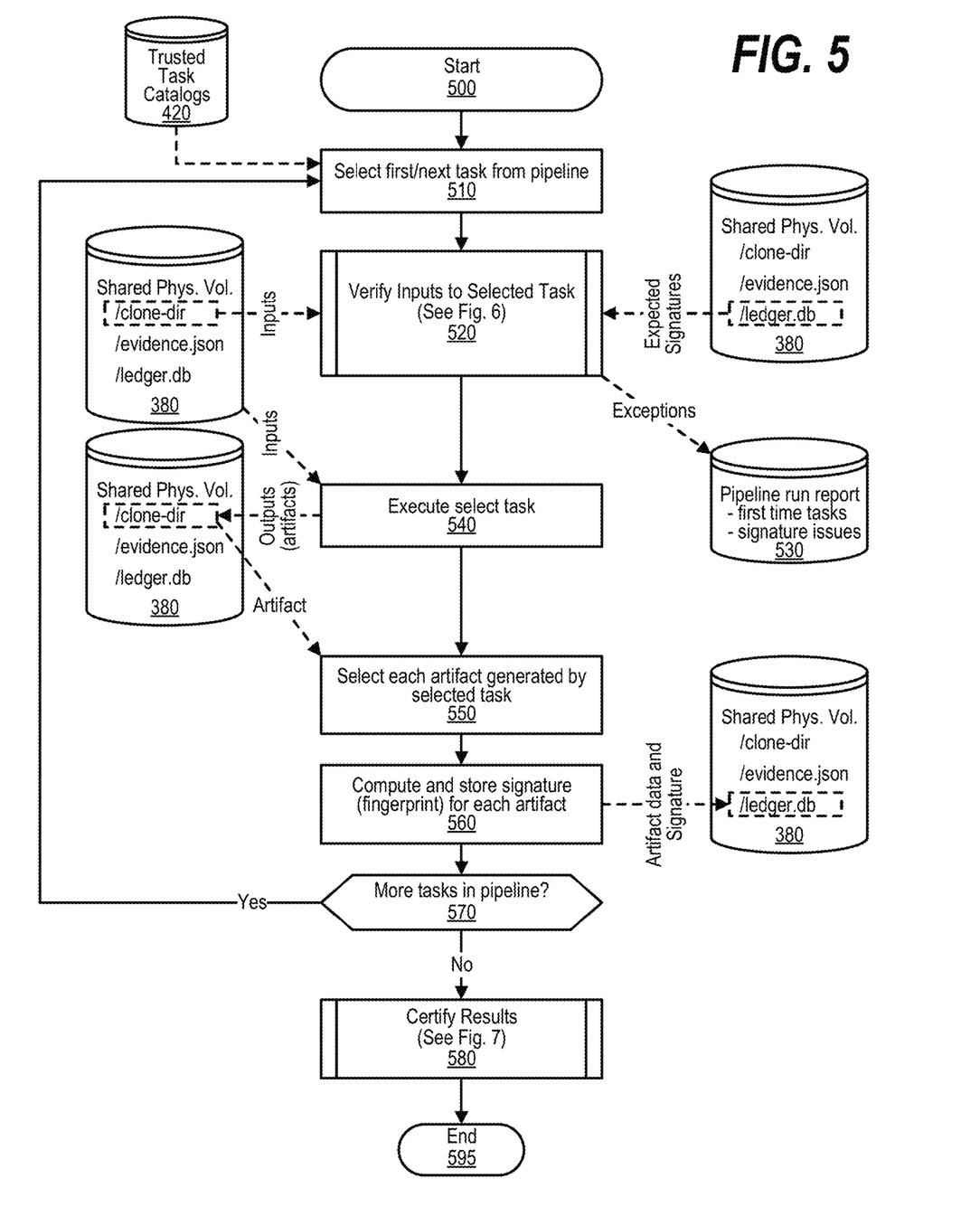
FIG. 5 is a flowchart depicting overall steps performed in a secured software pipeline operation.

FIG. 5 is a flowchart depicting overall steps performed in a secured software pipeline operation. Processing commences at 500 whereupon, at step 510, the process selects the first task from pipeline as configured and listed for this pipeline in trusted task catalog data store 420. At predefined process 520, the process performs the Verify Inputs to Selected Task routine (see FIG. 6 and corresponding text for processing details). This routine computes fingerprints for inputs (e.g., data files, etc.) about to be input by the selected task, compares the computed fingerprints with the expected fingerprints retrieved from ledger.db that is stored on shared physical volume 380. When a computed fingerprint does not match its expected fingerprint, an exception occurs and these exceptions are written to data store 530.

At step 540, the process executes the selected task. The selected task inputs artifacts from data store 380 with fingerprint comparisons already having been performed on these inputs. Outputs from execution of the selected task are stored back in data store 380. At step 550, the process selects each artifact (outputs) generated by the selected task. At step 560, the process computes and store signature (an expected fingerprint) for each of these artifact (each output). The expected signatures for each output are stored back in data store 380, such as in the ledger.db.

The process determines as to whether there are more tasks configured in the pipeline that have yet to be executed (decision 570). If more tasks are in the pipeline, then decision 570 branches to the 'yes' branch which loops back to step 510 to select and process the next task as described above. This looping continues until all tasks have been executed, at which point decision 570 branches to the 'no' branch exiting the loop. After all of the tasks have been executed, the results are certified by predefined process 580 (see FIG. 7 and corresponding text for processing details). The certification of the results of the pipeline informs the user, such as a software developer, of any inputs to tasks that were not the expected inputs (the computed fingerprints of such inputs did not match the corresponding expected fingerprints for such tasks). FIG. 5 processing thereafter ends at 595.

Figure 6:
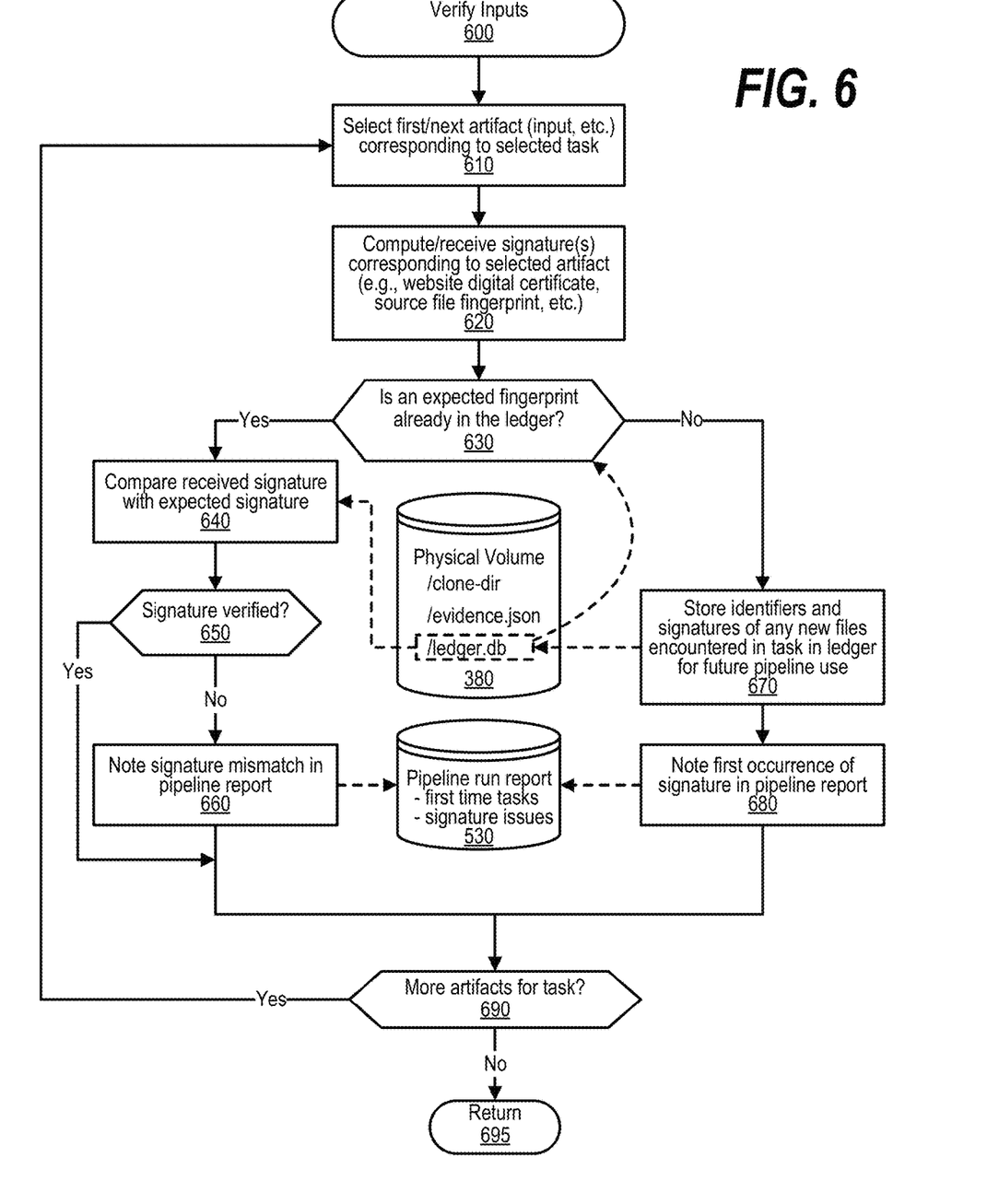
FIG. 6 is a flowchart depicting steps performed to verify inputs to a task in the pipeline that is about to execute.

FIG. 6 is a flowchart depicting steps performed to verify inputs to a task in the pipeline that is about to execute. FIG. 6 processing commences at 600 and shows the steps taken by a process that verifies Inputs to a task that is about to be executed. This routine is called by the routine depicted in FIG. 5. At step 610, the process selects the first artifact (e.g., input, such as a data file or data that was output by preceding task, etc.) that corresponds to the selected task. At step 620, the process computes a fingerprint for the selected input. In one embodiment, the process can also verify a network source by receiving a digital certificate corresponding to the network location where the input was stored, such as a website, etc.

The process determines as to whether an expected fingerprint is already stored in the ledger (decision 630). If is an expected fingerprint is already stored in the ledger, then decision 630 branches to the 'yes' branch to perform steps 640 through 660. On the other hand, if an expected fingerprint is not already stored in the ledger, then decision 630 branches to the 'no' branch and performs steps 670 and 680.

If an expected fingerprint is already stored in the ledger then steps 640-660 are performed. At step 640, the process compares the computed signature that was computed at step 620 with the expected signature retrieved from the ledger. The process determines as to whether the computed fingerprint matches the expected fingerprint (decision 650). If the computed fingerprint matches the expected fingerprint, then decision 650 branches to the 'yes' branch bypassing step 660. On the other hand, if the computed fingerprint does not match the expected fingerprint, then decision 650 branches to the 'no' branch whereupon, at step 660, the process notes signature mismatch in pipeline report by writing the task, input, and error data (fingerprint mismatch) to data store 530.

Returning to decision 630, if an expected fingerprint is not yet in the ledger, then steps 670 and 680 are performed. At step 670, the process stores the input identifiers (e.g., file and path name, etc.) and computed fingerprint of the new inputs (e.g., source code files, etc.) encountered in task in ledger for future use when the pipeline is re-executed. At step 680, the process notes the first occurrence of the input and its fingerprint data in pipeline report stored in data store 530. In this manner, the user can ensure that the input that was used was indeed the correct input for this task of the pipeline.

The process determines as to whether there are more artifacts (inputs) for the task yet to be processed (decision 690). If there are more inputs for the task yet to be processed, then decision 690 branches to the 'yes' branch which loops back to step 610 to select and process the next input as described above. This looping continues until all inputs for the selected task have been processed, at which point decision 690 branches to the 'no' branch exiting the loop. FIG. 6 processing thereafter returns to the calling routine (see FIG. 5) at 695.

Figure 7:
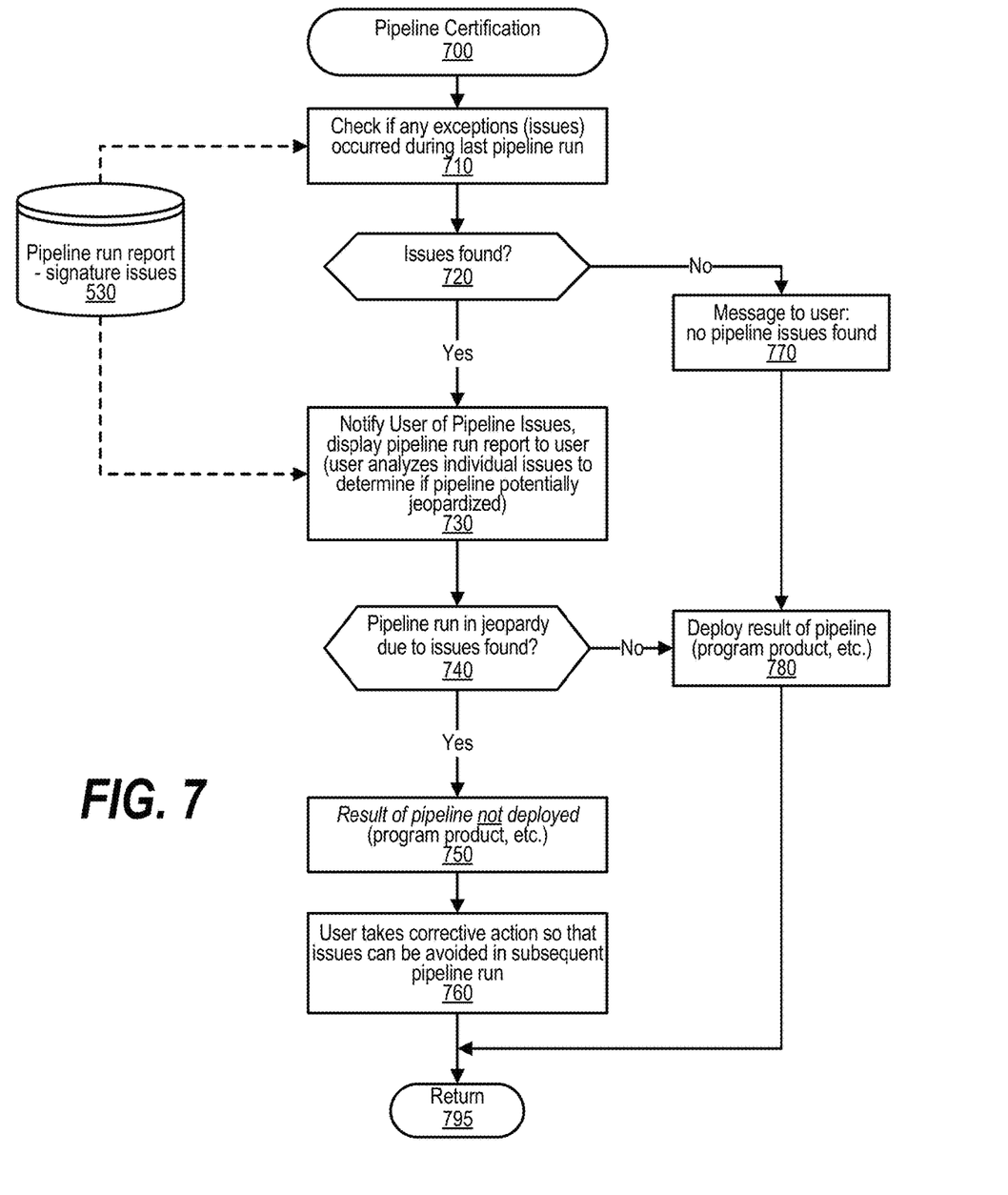
FIG. 7 is a flowchart depicting steps performed to certify results after the pipeline has been executed.

FIG. 7 is a flowchart depicting steps performed to certify results after the pipeline has been executed. FIG. 7 processing commences at 700 and shows the steps taken by a pipeline certification process. At step 710, the process checks if any exceptions (issues) occurred during last pipeline run by checking if any exceptions were written to data store 530. The process determines as to whether any issues found during the last pipeline run (decision 720). If issues were found, then decision 720 branches to the 'yes' branch to notify the user of such issues. On the other hand, if not issues found, then decision 720 branches to the 'no' branch whereupon at step 770 the user is informed that no issues were found during the pipeline run.

At step 730, the process notifies the user of any pipeline issues that occurred during the last pipeline run by displaying the pipeline run report from data store 530 to the user. The user can then analyze individual issues to determine if the pipeline is potentially jeopardized due to an input fingerprint to a task not matching its corresponding expected fingerprint. A determination is made as to whether the last pipeline run is in jeopardy, and therefore should not be deployed, based on the issues noted in datastore 530 (decision 740).

If the pipeline run is in jeopardy, then decision 740 branches to the 'yes' branch whereupon, at step 750, the results of the pipeline (e.g., a software product, update, etc.) are not deployed and, at step 760, the user can take corrective actions to address the noted issues so that the issues can be avoided in subsequent pipeline runs. On the other hand, if the user determines that the pipeline run is not in jeopardy and that it is safe to deploy the results of the pipeline, then decision 740 branches to the 'no' branch and, at step 780, the results of the pipeline are deployed. In addition, step 780 is also performed if no issues were found during the pipeline run (decision 710 branching to the 'no' branch). Processing then returns to the calling routine (see FIG. 5) at 795.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
 selecting a current processing element from a plurality of processing elements included in a software pipeline, wherein a first selected input data to the current processing element is an output data from a previously executed processing element, and wherein a second selected input data to the current processing element is a file that is not generated by any of the processing elements included in the software pipeline;
verifying the at least one input data, the verifying including:
    computing a first current fingerprint of the first selected input data; and
    comparing the first current fingerprint to a first expected fingerprint,
        wherein the first expected fingerprint was computed after the output data was generated by the previously executed processing element;
    indicating a first verification error in response to the comparing revealing that the first current fingerprint fails to match the first expected fingerprint and verifying the second selected input data by:
        computing a second current fingerprint of the second selected input data; and
        comparing the second current fingerprint to a second expected fingerprint,
            wherein the second expected fingerprint was previously before execution of the software pipeline; and
        indicating a second verification error in response to the comparing revealing that the second current fingerprint fails to match the second expected fingerprint.

2. The method of claim 1 wherein the file that is the second input data is stored on a data store accessible over a computer network.

3. The method of claim 2 wherein the file is a shared program code file.

4. The method of claim 3 wherein the data store is maintained by a web site accessible over the computer network, the method further comprising:
    authenticating the web site using a digital certificate issued to the web site.

5. The method of claim 1 further comprising:
    verifying each of a plurality of inputs, including the first and second inputs, input by each of the plurality of processing elements; and
    indicating any of the plurality of inputs that compute fingerprints that fail to match corresponding fingerprints of the respective plurality of inputs.

6. The method of claim 5 further comprising:
    generating a report that includes each of the indications where computed fingerprints failed to match corresponding fingerprints; and
    notifying a user when at least one of the plurality of inputs fails to match its respective corresponding fingerprint.

7. An information handling system comprising:
    one or more processors;
    a memory coupled to at least one of the processors; and
    a set of instructions stored in the memory and executed by at least one of the processors to:
        selecting a current processing element from a plurality of processing elements included in a software pipeline, wherein a first selected input data to the current processing element is an output data from a previously executed processing element, and wherein a second selected input data to the current processing element is a file that is not generated by any of the processing elements included in the software pipeline;
    verifying the at least one input data, the verifying including:
        computing a first current fingerprint of the first selected input data; and
        comparing the first current fingerprint to a first expected fingerprint,
            wherein the first expected fingerprint was computed after the output data was generated by the previously executed processing element; and
        indicating a first verification error in response to the comparing revealing that the first current fingerprint fails to match the first expected fingerprint and verifying the second selected input data by:
            computing a second current fingerprint of the second selected input data; and
            comparing the second current fingerprint to a second expected fingerprint,
                wherein the second expected fingerprint was previously before execution of the software pipeline; and
            indicating a second verification error in response to the comparing revealing that the second current fingerprint fails to match the second expected fingerprint.

8. The information handling system of claim 7 wherein the file that is the second input data is stored on a data store accessible over a computer network.

9. The information handling system of claim 8 wherein the file is a shared program code file.

10. The information handling system of claim 9 wherein the data store is maintained by a web site accessible over the computer network, wherein the steps further comprise:
    authenticating the web site using a digital certificate issued to the web site.

11. The information handling system of claim 7 wherein the steps further comprise:
    verifying each of a plurality of inputs, including the first and second inputs, input by each of the plurality of processing elements; and
    indicating any of the plurality of inputs that compute fingerprints that fail to match corresponding fingerprints of the respective plurality of inputs.

12. The information handling system of claim 11 wherein the steps further comprise:
    generating a report that includes each of the indications where computed fingerprints failed to match corresponding fingerprints; and
    notifying a user when at least one of the plurality of inputs fails to match its respective corresponding fingerprint.

13. A computer program product comprising:
    a computer readable storage medium comprising a set of computer instructions,
    the computer instructions, when executed, performing steps comprising:
        selecting a current processing element from a plurality of processing elements included in a software pipeline, wherein a first selected input data to the current processing element is an output data from a previously executed processing element, and wherein a second selected input data to the current processing element is a file that is not generated by any of the processing elements included in the software pipeline;
        verifying the at least one input data, the verifying including:
            computing a first current fingerprint of the first selected input data; and
            comparing the first current fingerprint to a first expected fingerprint,
                wherein the first expected fingerprint was computed after the output data was generated by the previously executed processing element;
            indicating a first verification error in response to the comparing revealing that the first current fingerprint fails to match the first expected fingerprint and verifying the second selected input data by:
  computing a second current fingerprint of the second selected input data; and
  comparing the second current fingerprint to a second expected fingerprint, wherein the second expected fingerprint was previously before execution of the software pipeline; and
indicating a second verification error in response to the comparing revealing that the second current fingerprint fails to match the second expected fingerprint.

14. The computer program product of claim 13 wherein the file that is the second input data is stored on a data store accessible over a computer network.

15. The computer program product of claim 14 wherein the file is a shared program code file and wherein the data store is maintained by a web site accessible over the computer network, the steps further comprise:

authenticating the web site using a digital certificate issued to the web site.

16. The computer program product of claim 13 wherein the steps further comprise: verifying each of a plurality of inputs, including the first and second inputs, input by each of the plurality of processing elements; and indicating any of the plurality of inputs that compute fingerprints that fail to match corresponding fingerprints of the respective plurality of inputs.

17. The computer program product of claim 16 wherein the steps further comprise:
  generating a report that includes each of the indications where computed fingerprints failed to match corresponding fingerprints; and
  notifying a user when at least one of the plurality of inputs fails to match its respective corresponding fingerprint.

* * * * *